No. 616,948. Patented Jan. 3, 1899.
C. MALMQUIST.
HAY OR MANURE LOADER.
(Application filed June 4, 1898.)
(No Model.) 2 Sheets—Sheet 1.
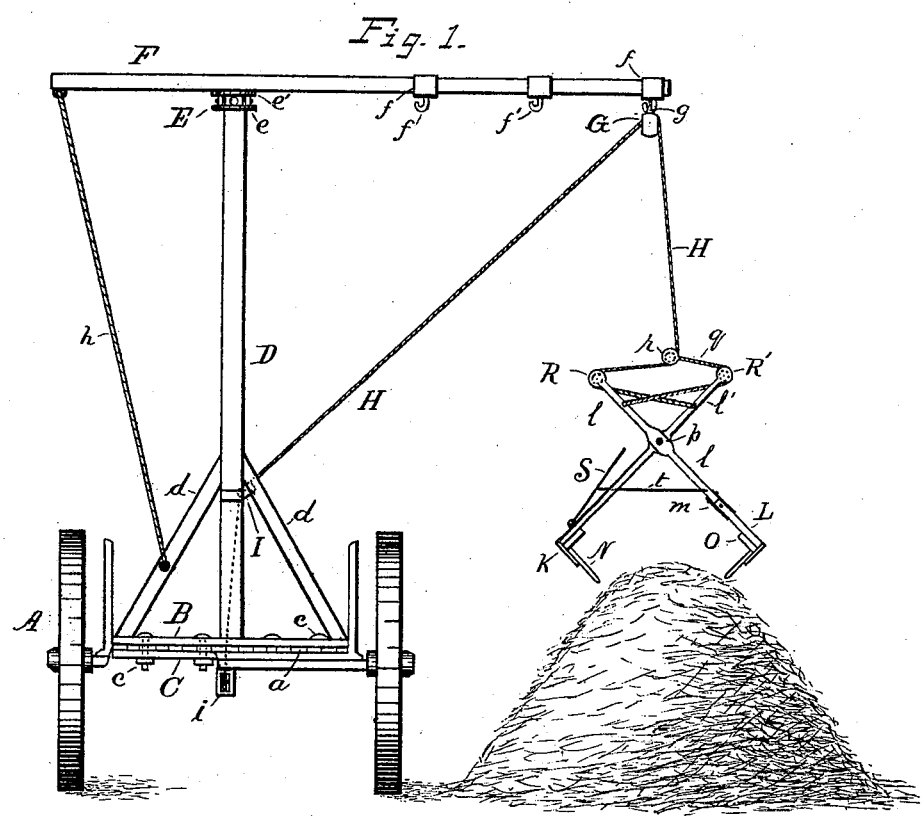
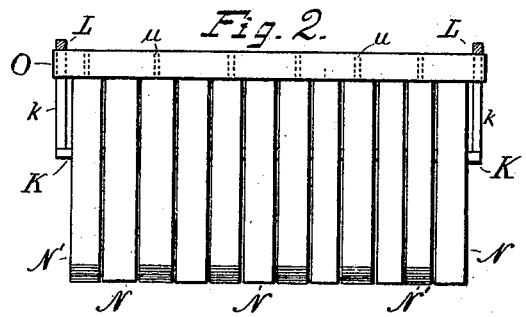
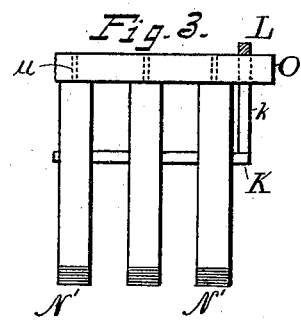
WITNESSES:
Chas. P. Swett.
D. P. Ormes.
INVENTOR
C. Malmquist.
BY
Chas. P. Swett
ATTORNEY.

No. 616,948. Patented Jan. 3, 1899.
C. MALMQUIST.
HAY OR MANURE LOADER.
(Application filed June 4, 1898.)
(No Model.) 2 Sheets—Sheet 2.
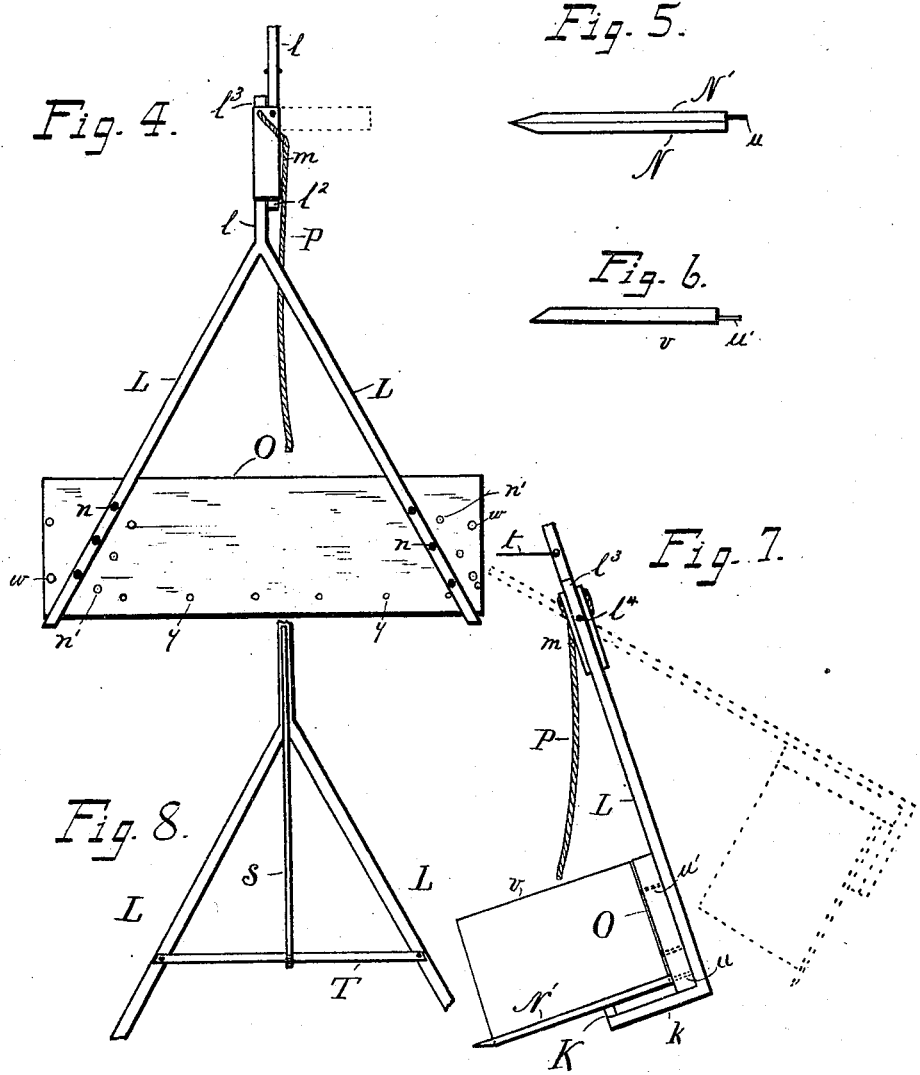

to speak, so that when the grappler is closed the two series may interlock.

UNITED STATES PATENT OFFICE.

CHARLES MALMQUIST, OF SIOUX CITY, IOWA.

HAY OR MANURE LOADER.

SPECIFICATION forming part of Letters Patent No. 616,948, dated January 3, 1899.

Application filed June 4, 1898. Serial No. 682,529. (No model.)

*To all whom it may concern:*

Be it known that I, CHARLES MALMQUIST, a citizen of the United States, residing at Sioux City, in the county of Woodbury and State of Iowa, have invented certain new and useful Improvements in Hay or Manure Loaders; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention comprises the general arrangement on a wagon of a frame bearing a beam with sheaves and cord to operate a grappler and also the novel construction of the grappling device.

The machine is well adapted for handling hay, straw, and cornstalks, but is especially intended for loading manure and such substances as are partly matted and bulky and partly in fine particles.

The accompanying drawings illustrate the invention, in which—

Figure 1 is a reduced elevation mounted on a wagon, a part of the latter being broken away. Fig. 2 is a plan of part of the grappler with the tines arranged as a scoop. Fig. 3 is a fragmentary view of the same with the tines arranged as a fork. Fig. 4 is a rear elevation of a grappler below its cross-pivot. Fig. 5 is a side elevation of the tines when paired. Fig. 6 is a top view of one of the side-boards. Fig. 7 is a profile of one member of the grappler, the dotted lines indicating its position when the grappler is opened; and Fig. 8 is a fragmentary detail showing the tightening-lever. Excepting Fig. 1 the views are approximately isometrical.

The letter A indicates an ordinary wagon having a rigid flooring $a$. B is a transverse bar above, and C a corresponding bar below, said floor and secured thereto by bolts $c\ c$.

A post D, having two or more braces $d\ d$, stands upon the bar B and supports at its top a small turn-table E, having a fixed roller track-plate $e$ and a rotary top plate $e'$. A beam F is fixed upon this top plate and turns with it. $f\ f$ are bands on the beam having hooks $f'\ f'$, to one of which is hung a sheave G by its eye $g$. A cord H, attached to the grappler, passes over the sheave G and, extending down to a sheave I on the post D, is continued through the sheave $i$ beneath the wagon, and thence to a windlass, horses, or other operating power. A stay-cord $h$ prevents the beam from tipping. When desired, I rig both ends of the beam with sheaves and cord to operate two grapplers at the same time, in which case the cord $h$ is not needed. A plurality of bands $f$ are provided, so that the sheave G may be moved along the beam as desired.

The grappler is composed of two members cross-pivoted at $p$. Above this pivot a short cord $q$, fastened to arm $l$ intermediate of its ends, passes through sheave R' at the upper end of arm $l'$ and terminates in an idle sheave $r$. The cord H passes through sheave $r$, thence around sheave R at the upper end of arm $l$, and is terminally secured to arm $l'$ intermediate of its ends. Below the pivot $p$ the arms $l\ l'$ are furnished with terminal counter "forks" or "scoops," so named according to the adjustment of the tines, but herein usually denominated "scoops." Each scoop is supported by backstays L L, which branch from an arm, as $l$. At right angles to said stays are bars $k\ k$, which support the base-bar K. On this base are secured, by rivets or other preferred means, the transverse tines N N, spaced by their own width, and on a backboard O are fixed, by tangs $u$, through holes $y$, other tines N' N', similar in form and spacing to those first mentioned. The backboard O is removably secured to the stays L L by pins $n\ n$ passing through holes $n'\ n'$ in the board. There are two series of these holes $n'$, so that the board may be raised and moved laterally a distance equal to the width of a tine, as N, and be again attached to the stays L L. In this latter position the tines N' on the board O rest upon the tines N on the base-bar, as in Figs. 3 and 5, and so arranged in vertical pairs act as a fork to penetrate compacted masses and to support a heavy load. When the tines are disposed singly side by side, as first described, they form a scoop adapted to take up and hold small particles of matter. The two series of tines are sharpened differently, those on the base having an upbevel, as N, and those attached to the backboard a downbevel, so that when paired a good entering edge is provided when most needed, a uniform edge in the scoop being of little consequence.

To increase the capacity of the device when used as a scoop, I attach side-boards $v$ to each end, standing them edgewise on the base K and securing them rearwardly to the back O by pins $u'$ through holes $w\ w$ in said board.

By the arrangement of cords H and $q$ at the upper end of the grappler the latter is impelled to close before rising as the cord H is drawn; but lest the material should be too compact for the entrance of the tines under the pressure thus afforded I provide a lever S, fulcrumed on a cross-bar T between the stays L L, and connect said lever by a rod $t$ to an opposite arm, as $l$, whereby when the lever-arm is drawn outwardly the two members of the grappler are strongly forced toward each other.

To empty the scoop, an arm, as $l$, below the pivot $p$, is made in two sections, whose adjacent ends $l^2\ l^3$ overlap each other laterally and are jointed by the pivot $l^4$. The scoop can then be swung out, as shown in Fig. 7, and the load will fall off. To make this joint rigid, buttons $m\ m$ are pivoted to one section above pivot $l^4$ and, overlapping the contiguous parts of these sections, extend below their pivot. The buttons are drawn aside by the tripping-cord P.

What I claim, and desire to secure, is—

1. In a hay and manure loader a scoop having a base-bar to support the tines, transverse bars fixed to backstays and supporting the base-bar and a scoop-back as described.

2. In a hay and manure loader a scoop having a series of tines adapted to be disposed side by side, or in vertical pairs for the purpose specified.

3. In a hay and manure loader a series of tines, of which alternate ones are fixed on the scoop-base, and the intermediate ones are attached to a movable back for the purpose specified.

4. In a hay and manure loader having adjustable tines the upbevel edges on alternate tines and the downbevel edges on intermediate tines as described.

5. A scoop having pivoted sections forming arms thereon, a flexible cord $q$ connected at one end to one of its arms $l$, intermediate of its ends, and passing around a sheave R' on the outer end of the other arm $l'$ is connected with an idle sheave $r$, and a second cord H, connected with the arm $l'$ of the other section intermediate of its ends, and which passes around a sheave R on the outer end of the other arm and around said idle sheave $r$, said parts being combined substantially as, and for the purpose set forth.

6. In a manure-loading grappler having two members a lever on one member connected by a rod to the other member for the purpose herein specified.

7. In the scoop of a manure-loader having a base-bar, and backboard, removable side-boards to rest on said base-bar and having pins to engage holes in said backboard.

8. In a hay and manure loader transverse bars bolted to a fixed wagon-floor, a post on the upper bar bearing a turn-table, a beam thereon furnished with a stay-cord and a plurality of bands, a sheave attachable thereto, a cord through said sheave having one end attached to the grappler and the other connected, through suitably-arranged sheaves, with operating power as described.

In testimony whereof I affix my signature in presence of two witnesses.

CHARLES MALMQUIST.

Witnesses:
   ALFRED LANON,
   R. J. ANDREWS.